Dec. 15, 1931. A. ESAU 1,836,316
METHOD OF TESTING THE PURITY OF SOLID OR LIQUID HYDROCARBONS
Filed March 3, 1930

Inventor:
Abraham Esau
by
Attorney.

Patented Dec. 15, 1931

1,836,316

UNITED STATES PATENT OFFICE

ABRAHAM ESAU, OF JENA, THURINGIA, GERMANY

METHOD OF TESTING THE PURITY OF SOLID OR LIQUID HYDROCARBONS

Application filed March 3, 1930, Serial No. 432,929, and in Germany March 13, 1929.

As is well known there are provided accurate testing regulations for oils employed in electrical apparatus, which will ensure the observation of a certain disruptive strength of the oils. Such tests are carried out with the aid of a sparking distance, whose dimensions are known, in that the distance of the balls and the voltage applied are ascertained. From these values the disruptive strength of the oil is thus obtained. According to another method the test is carried out by the intermediary of a chemical analysis.

According to the invention another method is suggested, in which the material to be tested, which in no way must be transformer oil only, but which may consist of any desired hydrocarburet, is subjected to the action of ultra-short waves, while the changes of temperature are measured.

An embodiment of the arrangement according to the invention is illustrated by way of example diagrammatically in the drawings.

Figure 1:
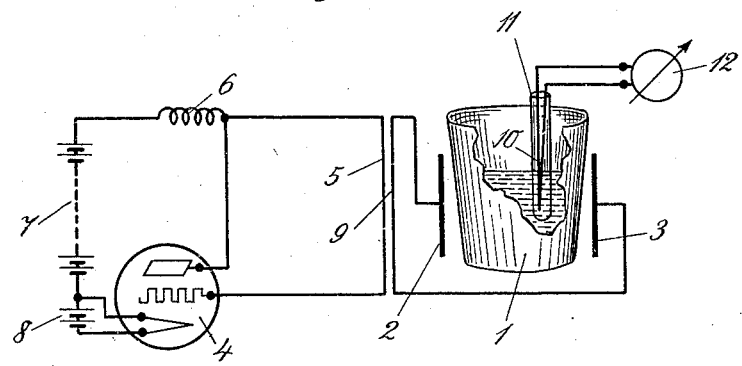
Figure 1 represents an influencing device having but one electron tube for the generation of the oscillations.

The mode of operation of the arrangement is as follows:

The hydrocarburet to be tested, particularly transformer oil, is contained in a crucible 1 arranged between two condenser-plates 2 and 3. These latter are fed by means of the tube or valve 4, which transfers its energy to the condenser circuit by the intermediary of the following arrangement. The said tube is connected as short wave generator by utilizing the inner tube-capacity between the electrodes. For that purpose the anode and the grid is connected by means of a wire stirrup, comprising the member 5. The admission of the anode voltage is effected by way of the choking coil 6 from the anode battery 7. The battery 8 serves for heating the cathode. With the piece of wire 5 acting as inductivity there is inductively coupled a parallel piece of wire 9, in which the condenser is cut in. In order to ascertain the rising temperature, a thermic element 10 is provided in the hydrocarbon to be tested, which element is fused into a glass tube 11 or the like for the sake of protection. A highly sensitive measuring instrument 12, which is duly gauged, is connected to both terminals of the thermic element.

As soon as the tube generator commences to operate there follows a rising of temperature and the contents of water can be ascertained from the value or magnitude of said rise of temperature.

Figure 2:
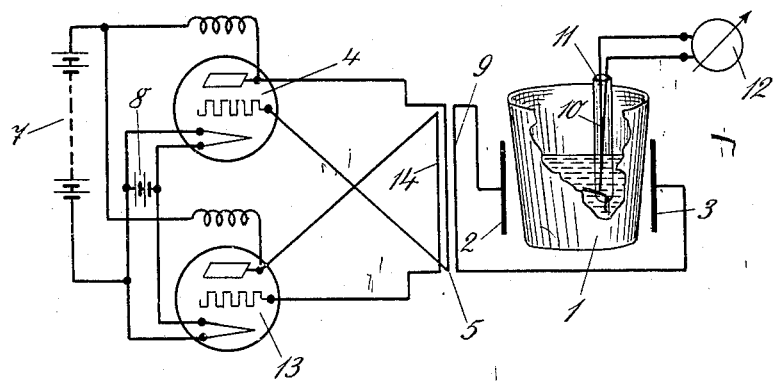
Figure 2 shows an arrangement in which two electron tubes cooperate in parallel.

As the energy of a single tube frequently will not be large enough, a second tube 13 connected in parallel is provided in the testing arrangement represented in Figure 2. This tube possesses the same inductivity as the tube 4, which is denoted by 14. These two tubes operated from common sources of current are thus not connected with one another on the high frequency side or end, but they are only coupled inductively to the common circuit 9, comprising the condenser 2, 3 and the reservoir 1. It is obvious that a plurality of tubes may be connected in parallel in the same manner.

In contradistinction to the known method, in which the disruptive strength of the oil is ascertained by means of sparking distances, the method according to the invention offers the advantage, that it is exceedingly simple and in addition it will avoid wrong measurements owing to an inaccurate operation of the sparking distance. With a very definite intensity of current and a predetermined testing period, for instance with anhydrous oil a rising of temperature of 10 degrees centigrade can be ascertained under the action of high frequencies. $10^8$ Hertz were chosen as testing frequency. By adding a single drop of water to a cup-glass full of oil a rising of the temperature up to 80 degrees centigrade could be ascertained within the same period. The rise of temperature, therefore, constitutes a very accurate gauge for the degree of impurity.

As follows from the testing data, there is only required a relatively short period for an accurate testing and a single measuring will prove sufficient, since the method according to the invention operates extremely accurate. The recording and ascertaining of the changes of temperature can be carried out according to any suitable method by means of a thermometer, thermic element, calorimeter or the like.

I claim:

1. Method of testing the purity of solid and liquid hydrocarburets comprising in combination the step of subjecting the material to be tested to the action of short electric waves and measuring the changes of temperature.

2. Method of testing the purity of solid and liquid hydrocarburets comprising in combination the step of subjecting the material to be tested to the action of short electric waves, testing it within a condenser field and measuring the changes of temperature.

3. The method of testing hydrocarbon compounds which consists in placing the material to be tested in the air gap of a condenser, causing short electric waves to flow across said gap, and observing the temperature variations induced in the compound.

4. The method of testing hydrocarbon compounds which consists in placing the compound in the air gap of a condenser circuit, inducing a short wave current in said circuit, and measuring the changes of temperature induced in the compound.

In testimony whereof I have affixed my signature.

ABRAHAM ESAU.